3,007,942
RESOLUTION OF TRIMESIC AND TRIMELLITIC ACID
Donald E. Burney, Hammond, and James O. Knobloch, Hobart, Ind., and Hsiang P. Liao, Park Forest, Ill., assignors to Standard Oil Company, Chicago, Ill., a corporation of Indiana
No Drawing. Filed Nov. 19, 1957, Ser. No. 697,315
3 Claims. (Cl. 260—346.3)

This invention relates to aromatic carboxylic acids and more particularly relates to an improved process for resolving mixtures of benzene polycarboxylic acids containing at least one polycarboxylic acid capable of forming an intramolecular anhydride.

The expanding plastics industry has imposed an ever-increasing demand for various benzene polycarboxylic acids. Ortho-phthalic, isophthalic, terephthalic, and trimellitic acids in particular are successfully employed in the production of plasticizers, alkyd paints and resins, and high quality polyester films and fibers. These products however often require that the benzene polycarboxylic acid ("aromatic acid") be in pure form, free even of isomeric or homologous aromatic acids. Because benzene palycarboxylic acids are customarily prepared by an oxidation reaction starting with the corresponding poly-alkyl substituted aromatic hydrocarbon, the close boiling points of the various poly-alkyl substituted aromatics has effectively prevented the isolation and oxidation of a single polyalkyl aromatic hydrocarbon as a route to the preparation of a single pure benzene polycarboxylic acid. It is then necessary to oxidize a mixture of alkyl-substituted aromatics and thereafter resolve the mixture of benzene polycarboxylic acids. Several resolution procedures involving fractional distillation, selective extraction, and selective reaction with alcohols or nitrogen bases have been suggested or employed, and while some are quite successful, disadvantages such as the corrosiveness of acid vapors or solutions and the expense of elaborate equipment and costly reagents has created a need for improved aromatic acid resolution procedures.

An object of the present invention is to provide an improved process for the separation of benzene polycarboxylic acids. A further object is to provide a process which is both versatile and highly efficient, and may be integrated with other separation procedures. A still further object is to extract a benzene polycarboxylic acid which is capable of forming an intramolecular anhydride from a mixture with other benzene polycarboxylic acids. Yet another object is to provide a separation process in which incompletely-oxidized alkyl aromatics may be recovered and recycled to the oxidation step. A particular object is to separate orthophthalic acid from isophthalic and terephthalic acids, and in addition to separate any benzoic acid. Another particular object is to separate and recover trimellitic acid from a mixture of benzene polycarboxylic acids. Other objects will become evident as the description of this invention proceeds.

According to the practice of the present invention, a mixture comprising benzene polycarboxylic acids, at least one but less than all of which is capable of forming an intramolecular anhydride (i.e. it has at least two ortho-oriented carboxyl groups), is heated to form such anhydride and the anhydride is extracted with an aromatic solvent. Thus, although benzene polycarboxylic acids which have at least two ortho-oriented carboxyl groups ordinarily are from about five to about fifteen times as soluble in aromatic solvents as are their isomers which lack this configuration, if the ortho-polycarboxylic acid is first dehydrated it becomes more than one hundred times as soluble as any of its isomers. In other words, the solubility in aromatic solvents of benzene tricarboxylic acids which have at least two ortho-oriented carboxyl groups is increased by a factor of from about 20 to about 80 merely by converting the acid to the anhydride. Consequently, by extracting the anhydride rather than the acid, it is possible to employ only one-twentieth to one-eightieth as much solvent as heretofore, and at the same time effect a sharper separation between polycarboxylic acids which are capable of forming anhydrides and those which are not. In a particularly advantageous embodiment of the present invention, the aromatic solvent comprises the aromatic feedstock (a mixture of alkyl-substituted aromatic compounds) which is oxidized to the mixture of benzene polycarboxylic acids. In this embodiment, partially-oxidized alkyl aromatics are also dissolved in the aromatic solvent and, after recovery of the polycarboxylic acid anhydride, are recycled while still dissolved in the solvent to the oxidation process. In another highly advantageous embodiment of the present invention, where the mixture of benzene carboxylic acids contains both benzoic acid and a polycarboxylic acid capable of forming an intramolecular anhydride, benzoic acid (which is very soluble in aromatic solvents) is first extracted from the mixture with an aromatic solvent at a temperature below the anhydride formation temperature. The first raffinate is then heated to dehydrate the benzene polycarboxylic acid capable of forming an intramolecular anhydride, and the intramolecular anhydride is extracted from the first raffinate with an aromatic solvent.

The present invention has important advantages over prior art processes which atempted to resolve mixtures of benzene carboxylic acids without first converting ortho-oriented acids to their intramolecular anhydrides. First, by virtue of the greatly increased solubility of the anhydrides it is possible to employ only a small fraction of the solvent heretofore necessary, with attendant improved separations and reduced equipment investment and operating costs. Second, the process is very versatile and may be employed in the resolution of mixtures of benzene carboxylic acids of widely varying compositions and derived from various sources, and furthermore may be integrated with other separation methods such as water extraction or selective esterification or the like to further resolve the raffinate. Third, unlike water extraction, aromatics do not dissolve the heavy metal oxidation catalysts employed for the molecular-oxygen oxidation of poly-alkyl substituted aromatics, further simplifying the purification of benzene polycarboxylic acids. An additional advantage is that incompletely-oxidized alkyl aromatics are more soluble in aromatic solvents than the fully oxidized polycarboxylic acids and accordingly may be dissolved along with the anhydride and, after recovery of the anhydride, recycled if desired to the oxidation step. An example of the latter advantage is in the oxidation of a xylene to a phthalic acid, where the oxidation intermediate (toluic acid) is soluble in aromatics to the extent of about 15 g./100 g. at 25° C. while the most soluble of the phthalic acids has a solubility of only about 0.1 gm. at the same temperature. Lastly, the aromatic solvents are low in cost, readily available, and are very stable.

The remarkable selectivity of aromatic solvents for benzene polycarboxylic acid anhydrides over their hydrous forms is shown in Table I below. Taking ortho-phthalic acid as an example, about fifty times as much anhydride dissolves at a given temperature as does the acid. With trimellitic anhydride the advantage is about 35 times. Other anhydrides behave in analagous manner.

TABLE I

*Solubility of aromatic acids and anhydrides in an aromatic solvent, gm./100 gm. solvent*

| Temp., °C. | Benzoic Acid [1] | o-Phthalic | | Trimellitic | |
|---|---|---|---|---|---|
| | | Acid [1] | Anhydride [1] | Acid [2] | Anhydride [2] |
| 0 | | | 1.9 | | 0.20 |
| 20 | 10.05 | 0.083 | 4.3 | 0.01 | 0.36 |
| 40 | 20.5 | 0.16 | 20.5 | | 0.62 |
| 60 | 39 | 0.30 | 23.7 | | 1.5 |
| 80 | 75 | 0.6 | 55 | | 2.0 |
| 100 | 140 | | 130 | | 3.6 |
| 120 | | | | | 6.4 |
| 140 | | | | 0.3 | 11.6 |
| 160 | | | | | 20 |
| 180 | | | | | 37 |
| 200 | | | | | 65 |

[1] In Benzene.
[2] In Xylenes.

From Table II below it is seen that aromatic hydrocarbons generally have boiling points very close to their isomers and homologues. Only 8° C. separates the lowest-boiling from the highest-boiling $C_8$ aromatic, and all 22 of the $C_{10}$ aromatics boil within about a 35° range. It is thus apparent that the separation of a single aromatic compound by fractional distillation from a mixture is difficult, to say the least, and on a commercial scale is economically impractical. For this reason it is necessary to prepare a comparatively narrow boiling fraction of mixed alkyl aromatics, oxidize the entire fraction, and thereafter resolve the mixture of benzene carboxylic acids.

other. Accordingly, among the three xylene oxidation products, only ortho-phthalic acid is subject to dehydration by heating. Intermolecular anhydrides such as benzoic acid anhydride of course exist, but their preparation cannot be effected simply by heating.

Mixed alkyl aromatics are commonly obtained by distillation from petroleum naphthas, or by extraction therefrom with a selective solvent, or they may be fractionated or extracted from a hydroformate produced by catalytically reforming (aromatizing) petroleum naphthas with for example a platinum-alumina or molybdena-alumina type catalyst. Conveniently a petroleum naphtha is catalytically hydroformed and the aromatic portion extracted from the hydroformate with a selective solvent such as diethylene glycol, phenol, sulfur dioxide or the like. The aromatic extract is then fractionated if necessary to exclude any benzene and toluene, and the remainder oxidized in toto or first redistilled to prepare an oxidation feedstock having a desired narrow boiling range. For example, a petroleum naphtha boiling between 70 and about 145° C. may be hydroformed to yield an aromatics-rich fraction having a similar boiling range, which is then subjected to extraction with diethylene glycol to recover a 99+% purity aromatics fraction consisting of benzene, toluene, ethylbenzene and the three xylenes. Fractional distillation of the aromatic extract provides substantially pure benzene and toluene cuts, together with a $C_8$-aromatic fraction boiling between 136 and 145° C. and having a composition averaging about 23.6 weight percent orthoxylene, 45.4% metaxylene, 18.0% paraxylene, and 13.0% ethylbenzene with a trace of toluene. Further separation of the $C_8$ fraction could

TABLE II

*Aromatic acids by the oxidation of alkyl-aromatic hydrocarbons* [1]

| Formula | BPS [2] | Alkyl-Aromatic Hydrocarbon | Atmospheric Boiling Point, °C. | Acid Produced | Forms Anhydride |
|---|---|---|---|---|---|
| $C_6H_6$ | 1 | Benzene | 80.103 | | |
| $C_7H_8$ | 1 | Methylbenzene (Toluene) | 110.623 | Benzoic | |
| $C_8H_{10}$ | 1 | Ethylbenzene | 136.187 | do | |
| | 2 | 1,4-Dimethylbenzene (p-Xylene) | 138.348 | Terephthalic | |
| | 3 | 1,3-Dimethylbenzene (m-Xylene) | 139.102 | Isophthalic | |
| | 4 | 1,2-Dimethylbenzene (o-Xylene) | 144.414 | Orthophthalic | Yes. |
| $C_9H_{12}$ | 1 | Isopropylbenzene (Cumene) | 152.393 | Benzoic | |
| | 2 | n-Propylbenzene | 159.216 | do | |
| | 3 | 1-Methyl-3-ethylbenzene | 161.301 | Isophthalic | |
| | 4 | 1-Methyl-4-ethylbenzene | 161.985 | Terephthalic | |
| | 5 | 1,3,5-Trimethylbenzene (Mesitylene) | 164.711 | Trimesic | |
| | 6 | 1-Methyl-2-ethylbenzene | 165.150 | o-Phthalic | Yes. |
| | 7 | 1,2,4-Trimethylbenzene (Pseudocumene) | 169.347 | Trimellitic | Yes. |
| | 8 | 1,2,3-Trimethylbenzene (Hemimellitene) | 176.080 | Hemimellitic | Yes. |
| $C_{10}H_{14}$ | 1 | tert-Butylbenzene (2-Phenyl-2-Methylpropane) | 169.113 | Benzoic | |
| | 2 | Isobutylbenzene (1-Phenyl-2-Methylpropane) | 172.755 | do | |
| | 3 | sec-Butylbenzene (2-Phenylbutane) | 173.299 | do | |
| | 4 | 1-Methyl-3-isopropylbenzene (m-Cymene) | 175.200 | Isophthalic | |
| | 5 | 1-Methyl-4-isopropylbenzene (p-Cymene) | 177.100 | Terephthalic | |
| | 6 | 1-Methyl-2-isopropylbenzene (o-Cymene) | 178.300 | o-Phthalic | Yes. |
| | 7 | 1,3-Diethylbenzene | 181.130 | Isophthalic | |
| | 8 | 1-Methyl-3-propylbenzene | 182.000 | do | |
| | 9 | n-Butylbenzene (1-Phenylbutane) | 183.267 | Benzoic | |
| | 10 | 1-Methyl-4-propylbenzene | 183.450 | Terephthalic | |
| | 11 | 1,2-Diethylbenzene | 183.480 | o-Phthalic | Yes. |
| | 12 | 1,3-Dimethyl-5-ethylbenzene | 183.750 | Trimesic | |
| | 13 | 1,4-Diethylbenzene | 183.780 | Terephthalic | |
| | 14 | 1-Methyl-2-propylbenzene | 184.000 | o-Phthalic | Yes. |
| | 15 | 1,4-Dimethyl-2-ethylbenzene | 186.910 | Trimellitic | Yes. |
| | 16 | 1,3-Dimethyl-4-ethylbenzene | 188.410 | do | Yes. |
| | 17 | 1,2-Dimethyl-4-ethylbenzene | 189.750 | do | Yes. |
| | 18 | 1,3-Dimethyl-2-ethylbenzene | 190.010 | Hemimellitic | Yes. |
| | 19 | 1,2-Dimethyl-3-ethylbenzene | 193.910 | do | Yes. |
| | 20 | 1,2,4,5-Tetramethylbenzene (Durene) | 196.000 | Pyromellitic | Yes. |
| | 21 | 1,2,3,5-Tetramethylbenzene (Isodurene) | 197.930 | Prehnitic | Yes. |
| | 22 | 1,2,3,4-Tetramethylbenzene (Prehnitene) | 205.04 | Mellophanic | Yes. |

[1] Source of data; National Bureau of Standards Circular 461, 1947.
[2] Boiling point sequence.

Table II also presents a tabulation of the acids produced by oxidation of the respective aromatic hydrocarbon, and indicates whether the aromatic acid is capable of forming an intramolecular anhydride. It will be noted that carboxylic acid anhydrides are obtained by heating benzene carboxylic acids having at least two carboxyl groups which are ortho-oriented with respect to each only be accomplished by expensive and elaborate low temperature crystallization or by ultra-fractionation. Similarly, higher boiling aromatic cuts are derived from higher boiling petroleum fractions or reformates. The composition of the higher boiling cuts will, as with the xylenes, be governed by the original composition of the petroleum naphtha together with the equilibrium and extent of approach to equilibrium in the hydroforming operation.

Oxidation of the mixed aromatics may be accomplished by any one of several known processes, some of which are described in the April 6, 1957, issue of Chemical Week, at pages 33–42. These include inter alia nitric acid oxidation; catalytic air oxidation of xylenes with molecular oxygen to toluic acids, followed by nitric acid oxidation to phthalic acids; catalytic oxidation of xylenes with molecular oxygen to toluic acids, esterification of the toluic acids, and further catalytic molecular-oxygen oxidation to the monomethyl phthalate, followed by hydrolysis to the acid; or by molecular oxygen oxidation directly to the polycarboxylic acid in a saturated monocarboxylic acid (i.e. a paraffinic or naphthenic acid containing from 2 to about 8 carbon atoms in the molecule such as acetic, propionic, caprylic, or cyclobutane carboxylic acid) in the conjoint presence of a heavy metal oxidation catalyst and bromine. The last mentioned process is particularly advantageous for the preparation of benzene polycarboxylic acids as it is a one-step oxidation and permits the use of air as the sole oxidizing agent and employs low cost catalysts such as manganese cobalt, iron or nickel, with, for example, ammonium bromide.

Recovery of mixed benzene polycarboxylic acids from an oxidation reaction mixture may be effected by various techniques depending on the particular aromatic feedstock oxidized and the nature of the oxidizing agent. For example, the solvent and water of oxidation may merely be distilled or evaporated off, leaving the carboxylic acid fraction as a bottoms. Alternatively, a reaction mixture may be filtered, preferably while at a temperature below about 100° C., to remove mixed aromatic acids, or it may be filtered at a temperature above about 100° C. to remove a first solids fraction containing insoluble aromatic acids such as iso- and terephthalic, and the filtrate cooled or distilled to recover a second mixture of polycarboxylic acids, which second mixture is to be treated according to the process of this invention. It will be understood that in lieu of filtration the equivalent solid-liquid phase separation techniques such as centrifugation, decantation, and cyclone separation may be employed. The mixed benzene polycarboxylic acid fraction may at this time be washed with water or other solvents to remove water-soluble impurities which may be present as a result of particular oxidation processes.

If the mixed benzene carboxylic acid fraction contains benzoic acid and/or an alkyl-substituted benzoic acid resulting from incomplete oxidation, these may advantageously be extracted from the mixed acids prior to dehydration by washing with a small amount of an aromatic solvent at a temperature below the anhydride formation temperature of any orthopolycarboxylic acid present. Except for some of the tertiary-alkyl-substituted ortho polycarboxylic acids which dehydrate at lower temperatures, an extraction temperature of below about 165° C. will suffice to prevent dehydration of ortho polycarboxylic acids. Since benzoic acid is soluble to the extent of 12.2 grams per 100 grams of benzene at 25° C. and alkyl-substituted benzoic acids are even more soluble, it is evident that only a comparatively small amount of aromatic solvent need be employed, and that the extraction temperature may even be below about 50° C. so as to avoid dissolving appreciable amounts of other carboxylic acids.

Heating mixed benzene polycarboxylic acids to dehydrate those acids capable of forming intramolecular anhydrides may be conducted under vacuum or at atmospheric or higher pressure and is facilitated when conducted in the presence of a water-immiscible liquid which boils above the water boiling point of 100° C. Hydrocarbons are suitable for this purpose, and either the paraffin or aromatic series may be employed to effect dehydration in a suitably short time. The liquid should preferably have a boiling point not substantially lower than 10 or 20° C. below the dehydration temperature of the particular ortho-polycarboxylic acid. The cymenes are preferred for dehydrating ortho-phthalic acid to phthalic anhydride, while durene or prehnitene and higher boiling aromatics are preferably employed with tricarboxylic acids such as trimellitic. Lower boiling aromatics may however be used, and even xylene will dehydrate 90% of trimellitic acid within 15 minutes at 225° C. Only one or two percent of the liquid is required but a larger amount may be employed in which event the dehydration and extraction are conducted simultaneously. The dehydration vessel is provided with a reflux condenser to reflux only the water-immiscible phase back to the vessel. Dehydration is terminated when it appears that no additional water is being evolved.

The polycarboxylic acid fraction containing the intramolecular anhydride produced by dehydration is then subjected to extraction with an aromatic solvent. Since the solubility of benzene carboxylic acids or anhydrides in aromatic solvents is essentially independent of the nature of the aromatic solvent, any aromatic compound having a boiling point preferably below about 200° C. may be employed both as the solvent for the anhydride, the solvent for benzoic acid and alkyl-substituted benzoic acids, and to facilitate dehydration. Those compounds listed in Table II or any mixtures thereof may be employed, and the solvent may contain minor amounts of non-aromatic hydrocarbons which do not alter the selectivity of aromatic solvents.

As previously noted, whether or not benzoic acid is first extracted from the mixture it is highly desirable to extract the intramolecular anhydride from the mixture of aromatic acids with a solvent comprising a portion of the aromatic feedstock which is later to be oxidized. By this procedure incompletely oxidized aromatics such as the toluic acids and the methyl phthalic acids are dissolved in the solvent and retained therein even after crystallization of the anhydride and may be recycled along with the solvent to the oxidation step.

The quantity and temperature of the aromatic solvent employed to extract the anhydride will depend on the particular solubility of that anhydride as shown in Table I. In general, it is found desirable to employ a temperature of from about 20 to about 200° C. and preferably between 50 and 100° C., so as to reduce the required amount of solvent, using pressure if necessary to retain the solvent in the liquid phase. Phthalic anhydride for example is soluble to the extent of 3.4 grams per 100 grams of solvent in toluene at 25° C., 39 grams at 100° and about 1000 grams at 200° C. Its solubility in other aromatics is within about plus or minus 20% of its solubility in toluene. Trimellitic anhydride is somewhat less soluble than phthalic. Extraction may be conducted either in the dehydration vessel or in a separate vessel, with either apparatus preferably having agitation means for providing intimate contact between the aromatic solvent and the polycarboxylic acid mixture. Following the extraction, the extract is separated from the undissolved benzene polycarboxylic acid raffinate by filtration near the extraction temperature.

Recovery of the polycarboxylic acid anhydride from the extract is conveniently accomplished by cooling and crystallizing the extract and filtering off the anhydride crystals. Crystallization may be effected by cooling to temperatures of about 0° C. to about 60° C., and where two anhydrides are present, as for example phthalic and trimellitic, a partial separation between the two may be effected by cooling the extract preferably to about 30–60° C. to crystallize a trimellitic anhydride-rich fraction and then further cooling to about 0–30° C. to recover a phthalic anhydride-rich fraction. The crystallized anhydride is contaminated by a small amount of solvent which may be removed by distillation or by air or vacuum drying.

Alternate methods of recovering the intramolecular anhydride include distillation or evaporation of the extract to remove the aromatic solvent, or flashing the extract into a lower pressure to flash off all or part of the solvent.

The solvent, after extraction and recovery of the anhydride, may either be recycled to the extraction step, distilled to separate incompletely oxidized aromatic compounds, or (if the solvent comprises a portion of the oxidation feedstock) conducted directly to the oxidation step. All or part of the solvent may be treated with activated charcoal to adsorb any colored oxidation by-products which may have been dissolved and which inhibit catalytic oxidation. If the aromatic solvent is to be recycled either to the extraction or to the oxidation step it is highly desirable to remove oxidation by-products from all or part of the returned stream.

To more fully understand the process of the present invention and some of its various embodiments, the following illustrative examples are presented.

EXAMPLE I

The process was first practiced on a synthetic mixture of benzene dicarboxylic acids corresponding in composition to a mixture prepared by oxidizing a 136–145° boiling range $C_8$-aromatics fraction with air at 200° C. and 28 atmospheres pressure in an acetic acid solvent and in the presence of a manganese bromide catalyst, filtering most of the isophthalic and terephthalic acids from the reaction medium at 200° C. under pressure, evaporating acetic acid and water from the filtrate at 118° C., and extracting benzoic acid from the recovered benzene carboxylic acid mixture with ¼ part by weight of toluene per part of mixture at 25° C. The synthetic mixture had the following composition.

| | Parts by weight |
|---|---|
| Orthophthalic acid | 34.00 |
| Isophthalic acid | 2.00 |
| Terephthalic acid | 2.00 |
| | 38.00 |

The above mixture was transferred to the reboiler of a ten-plate distillation column having an overhead reflux condenser adapted to return non-aqueous distillate to the column. 2.6 parts of xylene was added to the column and the reboiler heated to 178–185° C., at which temperatures boiling of the xylene and dehydration of orthophthalic acid occurred. Within a period of 15 minutes, 3.6 parts of water was collected in the reflux condenser; the theoretical amount of water which can be removed is 3.69 parts. Further heating failed to produce any additional water.

The reboiler contents were cooled to 20° C. and formed a solid mass. This was withdrawn, pulverized, and transferred to an enclosed glass extraction vessel. 260 parts by weight of toluene was added to the vessel, and the resulting slurry agitated at 85° C. for 15 minutes.

The slurry was cooled to 60° C. and filtered, and the filter cake washed with 17.5 parts of toluene and then air dried. The filter cake weighed 3.96 parts, representing 99.0% of the 4.00 parts of iso- and terephthalic acids charged. It had an acid number of 659, corresponding to the theoretical iso- and terephthalic acid number of 675.

Evaporation of the filtrate produced 28.60 parts of phthalic anhydride, which is 94.5% of the theoretical 29.50 parts. It had an acid number of 757; since the theoretical acid number for phthalic anhydride is 759, the recovered product had better than a 97.0% purity.

EXAMPLE II

A mixture of aromatic compounds obtained from a petroleum reformate and boiling between about 164 and 179° C. contains $C_9$ and $C_{10}$ aromatics and is predominantly pseudocumene, with somewhat less mesitylene and minor amounts of other aromatics. When such a mixture is oxidized there is obtained a mixture of trimellitic and trimesic acids and insubstantial amounts of other aromatic acids. Trimellitic but not trimesic acid is capable of forming an anhydride.

A synthetic mixture containing known quantities of trimellitic and trimesic acids was prepared to duplicate this mixture. It had the following composition.

| | Parts by weight | |
|---|---|---|
| Trimesic acid | 5.279 | (2.4 mols). |
| Trimellitic acid | 10.088 | (4.7 mols). |
| | 15.367 | |

It was placed in the reboiler of a ten-plate distillation column adapted to reflux only non-aqueous distillate. Ten parts (9.8 mols) of acetic anhydride and 125 parts of xylene was added to facilitate dehydration and the mixture boiled at atmospheric pressure for one hour.

The material in the reboiler was withdrawn and filtered at the boiling point to separate the insoluble trimesic acid. After drying the trimesic acid, it weighed 5.237 parts and had an acid number of 802 (theory is 801), corresponding to a separation efficiency in excess of 99%. Infrared analysis is unable to detect the presence of any trimellitic acid or anhydride.

From the foregoing discussion and examples, it is manifest that the process of this invention fully satisfies the objects thereof and permits the almost quantitative separation of benzene polycarboxylic acids which are capable of forming anhydrides from those which are not.

Having described the invention, what is claimed is:

1. A process for resolving a mixture of trimesic acid and trimellitic acid which comprises: heating the mixture at a temperature sufficient to convert trimellitic acid to trimellitic anhydride, extracting the trimellitic anhydride from the mixture with an aromatic hydrocarbon solvent, and recovering the extracted trimellitic anhydride.

2. Process of claim 1 wherein said trimellitic anhydride is extracted at an elevated temperature and is recovered by cooling the extract and effecting crystallization of the anhydride.

3. Process of claim 1 wherein said aromatic hydrocarbon solvent is xylene.

References Cited in the file of this patent

UNITED STATES PATENTS

| 1,892,396 | Jaeger | Dec. 27, 1932 |
| 1,919,023 | Jaeger | July 18, 1933 |
| 2,569,440 | Agnew | Oct. 2, 1951 |
| 2,729,674 | McKinnis | Jan. 3, 1956 |